US012659585B2

(12) United States Patent
Hashimoto

(10) Patent No.: US 12,659,585 B2
(45) Date of Patent: Jun. 16, 2026

(54) INSPECTION METHOD, INSPECTION DEVICE, AND RECORDING MEDIUM

(71) Applicant: Magnolia Blue Corporation, Tokyo (JP)

(72) Inventor: Shinichiro Hashimoto, Tokyo (JP)

(73) Assignee: MAGNOLIA BLUE CORPORATION, Tokyo (JP)

( * ) Notice: Subject to any disclaimer, the term of this patent is extended or adjusted under 35 U.S.C. 154(b) by 0 days.

(21) Appl. No.: 19/076,026

(22) Filed: Mar. 11, 2025

(65) Prior Publication Data

US 2025/0211856 A1 Jun. 26, 2025

Related U.S. Application Data

(63) Continuation of application No. PCT/JP2023/031889, filed on Aug. 31, 2023.

(30) Foreign Application Priority Data

Sep. 13, 2022 (JP) ................................. 2022-145333

(51) Int. Cl.
H04N 23/67 (2023.01)
G06T 7/00 (2017.01)
H04N 23/71 (2023.01)

(52) U.S. Cl.
CPC ......... H04N 23/675 (2023.01); G06T 7/0004 (2013.01); H04N 23/71 (2023.01);
(Continued)

(58) Field of Classification Search
CPC ...... H04N 23/675; H04N 23/71; H04N 23/67; G06T 7/0004; G06T 2207/10148;
(Continued)

(56) References Cited

U.S. PATENT DOCUMENTS 5,742,378 A 4/1998 Kumagai et al.
11,948,318 B1 * 4/2024 Fleming-Mwanyoha ...................
G06T 7/85

(Continued)

FOREIGN PATENT DOCUMENTS

JP H6-113187 A 4/1994
JP 3316684 B2 8/2002
(Continued)

OTHER PUBLICATIONS

International Search Report dated Oct. 17, 2023, for corresponding International Patent Application No. PCT/JP2023/031889 (4 pages).
(Continued)

*Primary Examiner* — Richard T Torrente
(74) *Attorney, Agent, or Firm* — Hauptman Ham, LLP

(57) ABSTRACT

An inspection method includes: obtaining a one-dimensional luminance profile by performing image processing of compressing a luminance of an inspection image of a pixel region of a display panel captured by an imaging device, into a one-dimensional luminance; generating a frequency spectrum intensity profile by performing Fourier transform on the one-dimensional luminance profile; calculating, based on a periodic structure of pixels shown in the pixel region, an imaging magnification of the imaging device from one or more peak positions included in the frequency spectrum intensity profile; and estimating a current focus position from the imaging magnification calculated and magnification information indicating a relationship between a focus position and an imaging magnification of the imaging device, the current focus position being a focus position of the imaging device in the inspection image.

7 Claims, 13 Drawing Sheets

(52) U.S. Cl.
CPC ............... *G06T 2207/10148* (2013.01); *G06T 2207/20048* (2013.01); *G06T 2207/30121* (2013.01)

(58) Field of Classification Search
CPC . G06T 2207/20048; G06T 2207/30121; G06T 2207/20056; G01M 11/00; G02B 7/28; G03B 13/36; G09F 9/00
See application file for complete search history.

(56) References Cited

U.S. PATENT DOCUMENTS

| | | | | |
|---|---|---|---|---|
| 2007/0002183 A1* | 1/2007 | Fujibayashi | ......... | H04N 19/176 348/180 |
| 2008/0073485 A1* | 3/2008 | Jahn | ......................... | G02B 7/36 356/73.1 |
| 2011/0032413 A1* | 2/2011 | Kulkarni | ................ | G03B 13/36 348/E5.045 |
| 2012/0237135 A1* | 9/2012 | Rybkin | ..................... | G06T 5/73 382/255 |
| 2013/0063566 A1* | 3/2013 | Morgan-Mar | .......... | G06T 7/571 348/46 |
| 2013/0113987 A1* | 5/2013 | Fukuda | .................... | G02B 7/28 348/349 |
| 2013/0266210 A1* | 10/2013 | Morgan-Mar | .......... | G06T 7/571 382/154 |

FOREIGN PATENT DOCUMENTS

| | | |
|---|---|---|
| JP | 2002-318343 A | 10/2002 |
| JP | 2004-294526 A | 10/2004 |
| JP | 2007-317862 A | 12/2007 |
| JP | 2011-220828 A | 11/2011 |

OTHER PUBLICATIONS

Written Opinion dated Oct. 17, 2023, for corresponding International Patent Application No. PCT/JP2023/031889 (3 pages).

* cited by examiner

65

Y-axis

X-axis

INSPECTION METHOD, INSPECTION DEVICE, AND RECORDING MEDIUM

CROSS REFERENCE TO RELATED APPLICATION

This is a continuation application of PCT International Patent Application No. PCT/JP2023/031889 filed on Aug. 31, 2023, designating the United States of America, which is based on and claims priority of Japanese Patent Application No. 2022-145333 filed on Sep. 13, 2022. The entire disclosures of the above-identified applications, including the specifications, drawings, and claims are incorporated herein by reference in their entirety.

FIELD

The present disclosure relates to an inspection method, an inspection device, and a recording medium.

BACKGROUND

The process of producing display panels includes various inspections for maintaining the product quality. Image inspection has great importance among such inspections.

Image inspection in recent years requires a higher-quality image for improved accuracy of determination by an operator, as well as by automatic inspection.

To enable image inspection with a high-quality image, an inspection device typically includes a sophisticated imaging element or optical system. Obtaining a high-quality image also depends on an autofocus mechanism crucial to the focus accuracy of the image, so that an inspection device may use an autofocus mechanism such as contrast-detection AF (e.g., Patent Literature (PTL) 1).

Contrast-detection AF involves searching for the contrast peak of an image while changing the focus position. That is, contrast-detection AF performs autofocus processing using the image itself, without the need for dedicated AF hardware. Contrast-detection AF thus advantageously achieves high focus accuracy.

CITATION LIST

Patent Literature

PTL 1: Japanese Patent No. 3316684

SUMMARY

Technical Problem

Unfortunately, while contrast-detection AF according to PTL 1 has the advantage of high focus accuracy, it has the disadvantage of slow operation due to the inability to determine whether the deviation of an out-of-focus camera position is in the positive direction or negative direction from the in-focus position. Because takt time is an important factor in an inspection device, using contrast-detection AF for an inspection device is a significant drawback.

Note that, in addition to contrast-detection AF, known autofocus mechanisms include laser AF. Laser AF involves emitting laser light to a panel to directly measure the distance to the panel surface, thus having the advantage of fast operation. However, laser AF has a disadvantage in that it requires dedicated AF hardware, and high-accuracy AF hardware is expensive. An inspection device using laser AF further has the following problem. Because laser AF measures the distance between a laser detector and the display panel surface, calibration is necessary for converting the measured distance into the distance between an optical system used for focus position alignment and the display panel surface.

The present disclosure has been made in view of the above circumstances and provides an inspection method and the like that enable processing for fast autofocus without the need for dedicated hardware.

Solution to Problem

An inspection method according to an aspect of the present disclosure is an inspection method, to be performed by a computer, for inspecting a display panel, the inspection method including: obtaining a one-dimensional luminance profile by performing image processing of compressing a luminance of an inspection image of a pixel region of the display panel captured by an imaging device, into a one-dimensional luminance on an axis in a direction perpendicular to an arrangement direction of a plurality of subpixels included in one pixel of a plurality pixels each including a plurality of subpixels; generating a frequency spectrum intensity profile by performing Fourier transform on the one-dimensional luminance profile; calculating, based on a fact that the plurality of pixels are arranged in a periodic structure in the pixel region, an imaging magnification of the imaging device from one or more peak positions included in the frequency spectrum intensity profile; and estimating a current focus position from the imaging magnification calculated and magnification information indicating a relationship between a focus position and an imaging magnification of the imaging device, the current focus position being a focus position of the imaging device in the inspection image.

As above, the current focus position of the imaging device in the inspection image can be estimated with just arithmetic processing and without the need for dedicated hardware. With the performance level of a computer having components such as modern processors, the luminance of the inspection image captured by the imaging device can be quickly compressed into the one-dimensional luminance and Fourier-transformed.

Thus, the inspection method in this aspect enables processing for fast autofocus without the need for dedicated hardware.

Furthermore, in the calculating, among the one or more peak positions, a peak position of a fundamental frequency may be estimated to be a peak position corresponding to a one-pixel unit structure of the pixel region shown in the inspection image, and the imaging magnification of the imaging device may be calculated from the peak position of the fundamental frequency.

Furthermore, for example, in the generating, the frequency spectrum intensity profile may be generated by performing the Fourier transform twice on the one-dimensional luminance profile.

Furthermore, for example, when an image of the pixel region of the display panel is captured by the imaging device at each of a plurality of focus positions of the imaging device, and a value of a fundamental frequency obtained by performing the Fourier transform on a one-dimensional luminance profile of the image captured at the focus position is used as the imaging magnification, the magnification information may be information indicating a relationship between the value of the fundamental frequency and the focus position.

Furthermore, for example, the inspection method may further include calculating, from the current focus position estimated and the magnification information, an amount of movement of the imaging device necessary for achieving focus, and adjusting a position of the imaging device using the amount of movement.

Furthermore, an inspection device according to an aspect of the present disclosure is an inspection device that inspects a display panel, the inspection device including: an obtainer that obtains a one-dimensional luminance profile by performing image processing of compressing a luminance of an inspection image of a pixel region of the display panel captured by an imaging device, into a one-dimensional luminance on an axis in a direction perpendicular to an arrangement direction of a plurality of subpixels included in one pixel of a plurality pixels each including a plurality of subpixels; a generator that generates a frequency spectrum intensity profile by performing Fourier transform on the one-dimensional luminance profile; a calculator that calculates, based on a fact that the plurality of pixels are arranged in a periodic structure in the pixel region, an imaging magnification of the imaging device from one or more peak positions included in the frequency spectrum intensity profile; and an estimator that estimates a current focus position from the imaging magnification calculated and magnification information indicating a relationship between a focus position and an imaging magnification of the imaging device, the current focus position being a focus position of the imaging device in the inspection image.

Furthermore, a recording medium according to an aspect of the present disclosure is a non-transitory computer-readable recording medium having recorded thereon a program for causing a computer to execute an inspection method for inspecting a display panel, the inspection method including: obtaining a one-dimensional luminance profile by performing image processing of compressing a luminance of an inspection image of a pixel region of the display panel captured by an imaging device, into a one-dimensional luminance on an axis in a direction perpendicular to an arrangement direction of a plurality of subpixels included in one pixel of a plurality pixels each including a plurality of subpixels; generating a frequency spectrum intensity profile by performing Fourier transform on the one-dimensional luminance profile; calculating, based on a fact that the plurality of pixels are arranged in a periodic structure in the pixel region, an imaging magnification of the imaging device from one or more peak positions included in the frequency spectrum intensity profile; and estimating a current focus position from the imaging magnification calculated and magnification information indicating a relationship between a focus position and an imaging magnification of the imaging device, the current focus position being a focus position of the imaging device in the inspection image.

Note that these general or specific aspects may be implemented as a device, a method, an integrated circuit, a computer program, a computer-readable recording medium such as a compact disc read-only memory (CD-ROM), or as any combination of systems, methods, integrated circuits, computer programs, and recording media.

Advantageous Effects

The present disclosure can provide an inspection method and the like that enable highly accurate and fast autofocus without the need for dedicated hardware.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
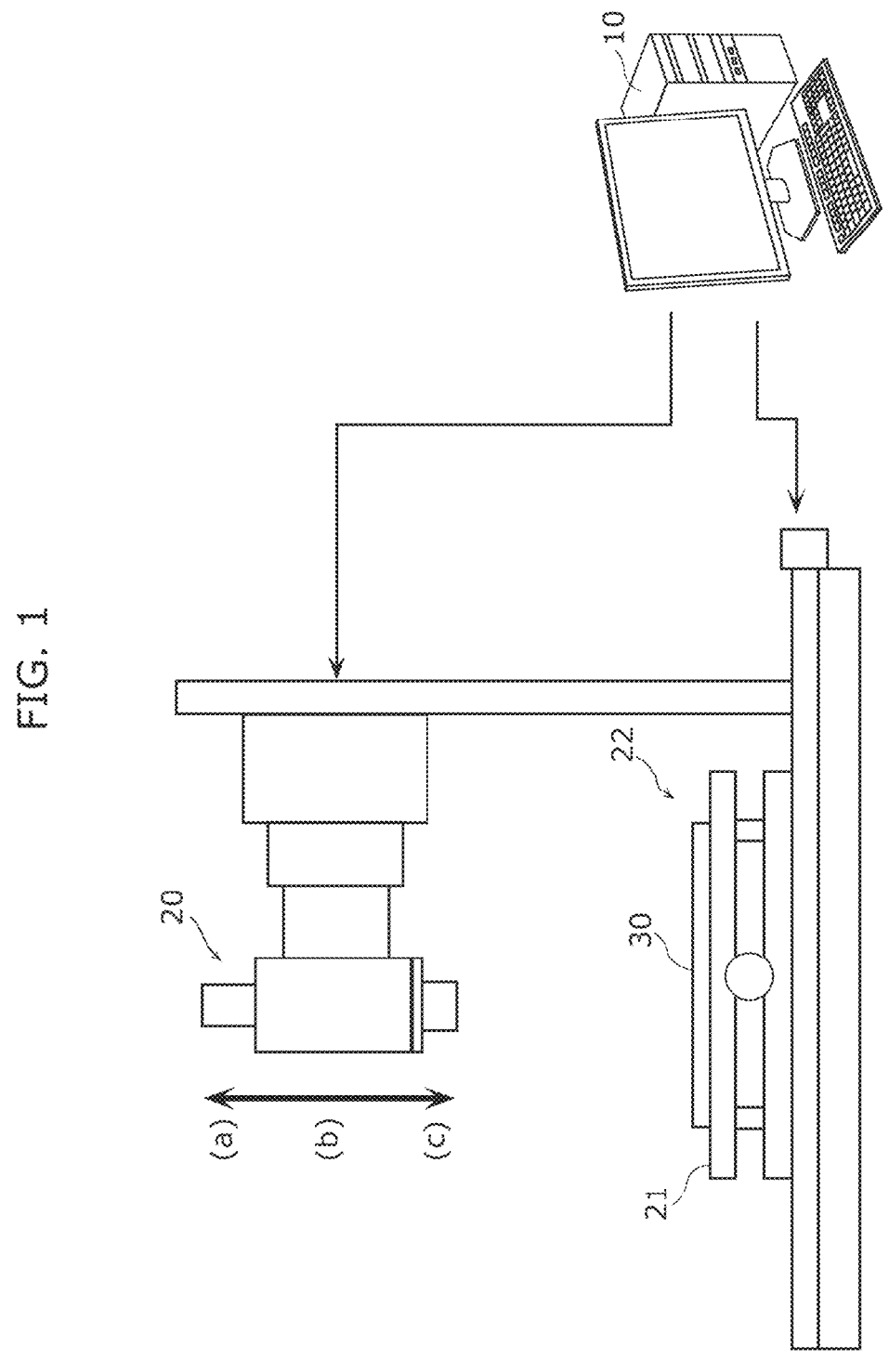
FIG. 1 is a diagram illustrating a schematic configuration of an inspection system that includes an inspection device according to an embodiment.

Hereinafter, an exemplary embodiment of the present disclosure will be described in detail with reference to the drawings. Note that the exemplary embodiment described below shows a specific example of the present disclosure. The numerical values, shapes, materials, standards, constituent elements, the arrangement and connection of the constituent elements, steps, the processing order of the steps, etc., indicated in the exemplary embodiment below are mere examples, and do not intend to limit the present disclosure. Also, among the constituent elements in the exemplary embodiment below, those not recited in any one of the independent claims of the present disclosure will be described as optional elements. Furthermore, each drawing is not necessarily a strict representation. In the drawings, the same reference signs are given to substantially the same elements, and duplicate description may be omitted or simplified.

EMBODIMENT

Now, an inspection device and the like according to an embodiment will be described.

[1. Inspection System]

Inspection device 10 according to the embodiment will be described below with reference to the drawings.

FIG. 1 is a diagram illustrating a schematic configuration of an inspection system that includes inspection device 10 according to the embodiment.

The inspection system illustrated in FIG. 1 includes inspection device 10, imaging device 20, stage 21, and stage driver 22.

Inspection device 10 is a device for performing image inspection using an inspection image obtained by capturing a pixel region of display panel 30. Here, display panel 30 is a panel such as a liquid crystal display panel or an organic EL display panel, and may be a rigid panel or a flexible panel. The pixel region of display panel 30 has pixels arranged in a matrix. Each pixel includes subpixels, for example RGB subpixels.

Imaging device 20, having an optical system that focuses lenses in a manner such as all-group focusing, captures the pixel region of display panel 30. An optical system of all-group focusing type shows a strong correlation between the focus position and the imaging magnification. Note that imaging device 20 may have an optical system that focuses lenses in a manner such as inner focus to capture the pixel region of display panel 30. An inner-focus optical system also shows a strong correlation between the focus position and the imaging magnification. The imaging magnification is the ratio between the size of an object image shown on the imaging plane and the actual size of the object. As shown in FIG. 1, imaging device 20 is maintained at a substantially constant distance from display panel 30 and moved as illustrated by (a) to (c) in FIG. 1 for focus position adjustment. In FIG. 1, (b) shows an example of the in-focus position, i.e., the proper focus position, whereas (a) and (c) show examples of out-of-focus positions.

Imaging device 20 captures the pixel region of display panel 30 to obtain an inspection image of display panel 30. Imaging device 20 can adjust the focus position of the optical system of imaging device 20 by moving to positions such as (a), (b), and (c) shown in FIG. 1. Note that imaging device 20 is controlled by inspection device 10 or may be controlled by some other computer.

Stage 21 holds display panel 30.

Stage driver 22, which includes a ball screw, a guide rail, and a motor, moves stage 21 relative to imaging device 20. Note that stage driver 22 is controlled by inspection device 10 or may be controlled by some other computer.

[1-1. Hardware Configuration of Inspection Device 10]

Figure 2:
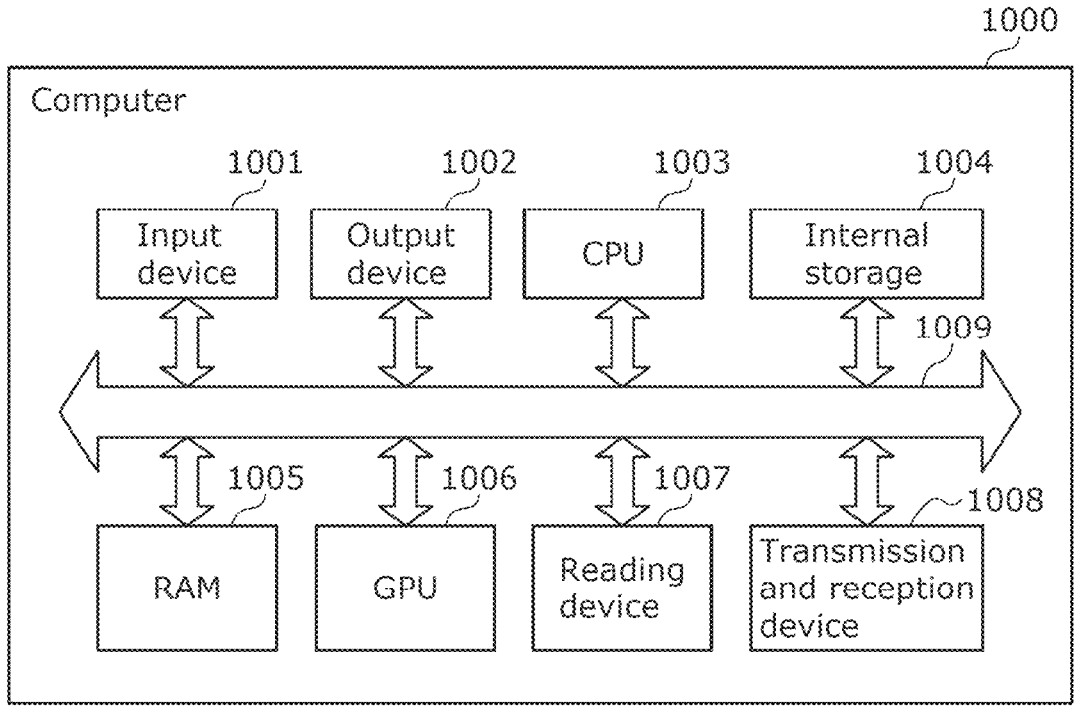
FIG. 2 is a diagram illustrating an example of a hardware configuration of a computer that uses software to implement the functions of an inspection device according to an embodiment.

Before describing functional components of inspection device 10 according to the embodiment, the following will describe, with reference to FIG. 2, an exemplary hardware configuration of inspection device 10 according to the embodiment.

FIG. 2 is a diagram illustrating an example of the hardware configuration of computer 1000 that uses software to implement the functions of inspection device 10 according to the embodiment.

As illustrated in FIG. 2, computer 1000 includes input device 1001, output device 1002, CPU 1003, internal storage 1004, RAM 1005, GPU 1006, reading device 1007, transmission and reception device 1008, and bus 1009. Input device 1001, output device 1002, CPU 1003, internal storage 1004, RAM 1005, reading device 1007, and transmission and reception device 1008 are interconnected via bus 1009.

Input device 1001, serving as a user interface such as input buttons, a touch pad, or a touch panel display, receives a user's operations. Note that, in addition to receiving the user's touch operations, input device 1001 may receive voice operations or receive remote operations through a remote controller.

Output device 1002, which doubles as input device 1001, includes a touchpad or a touch panel display and provides information to be received by the user.

Internal storage 1004 may be a flash memory or the like. Internal storage 1004 may have stored therein at least one of the following: a program for implementing the functions of inspection device 10, and an application that uses the functional components of inspection device 10. Internal storage 1004 may store items related to the description below, such as a procedure of image processing, a formula of Fourier transform (FT), a formula of fast Fourier transform (FFT), a procedure including the program, a procedure of calculating the imaging magnification of imaging device 20, a procedure of estimating the current focus position of imaging device 20, and magnification information of imaging device 20.

RAM 1005, a random access memory, is used to store items such as data during the execution of the program or application.

GPU 1006, a graphics processing unit, copies the program, application, or data stored in internal storage 1004 to a dedicated RAM inside the GPU and performs graphics processing according to instructions in the program or application.

Reading device 1007 reads information from recording media such as a universal serial bus (USB) memory. Reading device 1007 reads the above program or application from a recording medium having the program or application recorded thereon, so that the program or application may be stored in internal storage 1004.

Transmission and reception device 1008 is a communication circuit for wireless or wired communication. For example, transmission and reception device 1008 may communicate with a network-connected server device and download the above program or application from the server device, so that the program or application may be stored in internal storage 1004.

CPU 1003, a central processing unit, copies the program or application stored in internal storage 1004 to RAM 1005, and sequentially reads instructions in the program or application from RAM 1005 to execute the instructions.

[1-2. Functional Components of Inspection Device 10]

Now, the functional components of inspection device 10 according to the embodiment will be described with reference to FIG. 3.

Figure 3:
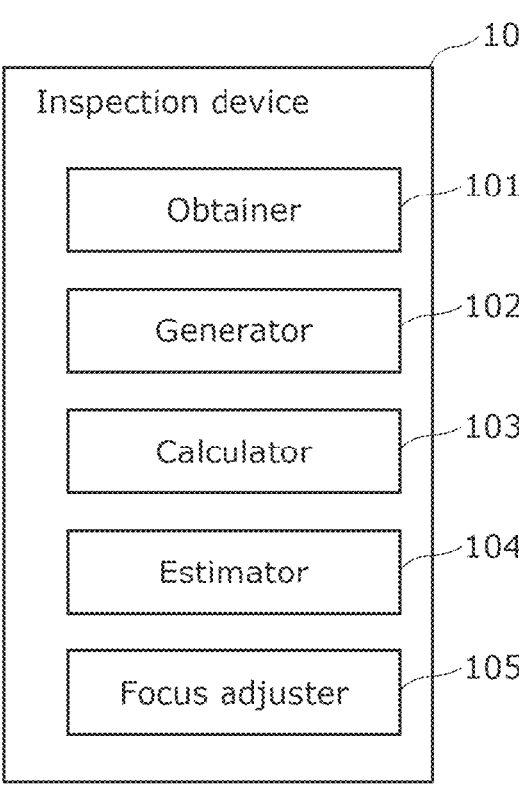
FIG. 3 is a block diagram illustrating an example of functional components of an inspection device according to an embodiment.

FIG. 3 is a block diagram illustrating an example of the functional components of inspection device 10 according to the embodiment.

As illustrated in FIG. 3, inspection device 10 includes obtainer 101, generator 102, calculator 103, estimator 104, and focus adjuster 105. Note that focus adjuster 105 need not be within inspection device 10 and may be an external component.

[1-2-1. Obtainer 101]

Obtainer 101 obtains an inspection image of a pixel region of display panel 30 captured by imaging device 20. Obtainer 101 obtains a one-dimensional luminance profile by performing image processing of compressing the luminance of the obtained inspection image into a one-dimensional luminance on an axis in the direction perpendicular to the arrangement direction of a plurality of subpixels included in one of a plurality pixels. Note that each of the plurality pixels includes a plurality of subpixels. The above image processing function and obtainment function of obtainer 101 may be implemented by a processor executing a control program stored in a memory in a computer that implements the functions of inspection device 10.

Figure 4:
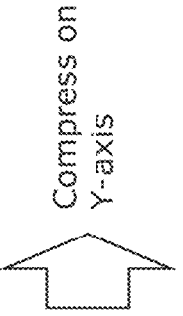
FIG. 4 is an example of an inspection image of a pixel region of a display panel according to an embodiment.

FIG. 4 is an example of the inspection image of the pixel region of display panel 30 according to the embodiment. FIG. 4 illustrates inspection image 61 as an example of an in-focus inspection image, i.e., an inspection image in proper focus. The pixel region shown in inspection image 61 presents pixels corresponding to units constituting a screen displayed by display panel 30, and subpixels subdividing each pixel; the subpixels each correspond to a point of a single color, for example, R, G, or B. That is, inspection image 61 in FIG. 4 shows the pixel region of display panel 30 in which a set of subpixels corresponding to points of different colors such as R, G, and B functions as each of the pixels constituting the pixel region. In the example shown in FIG. 4, each of the pixels arranged in a matrix includes vertically rectangular subpixels of blue (B), red (R), and green (G), with the B subpixel being wider than R and G subpixels. Thus, the pixel region shown in inspection image 61 illustrated in FIG. 4 has pixels arranged in a periodic structure. Hereinafter, the X-axis refers to the arrangement direction of the subpixels in each pixel, i.e., the arrangement direction of a plurality of subpixels included in one pixel of a plurality pixels each including a plurality of subpixels. The Y-axis refers to the direction perpendicular to the arrangement direction of the subpixels in each pixel.

Figure 5:
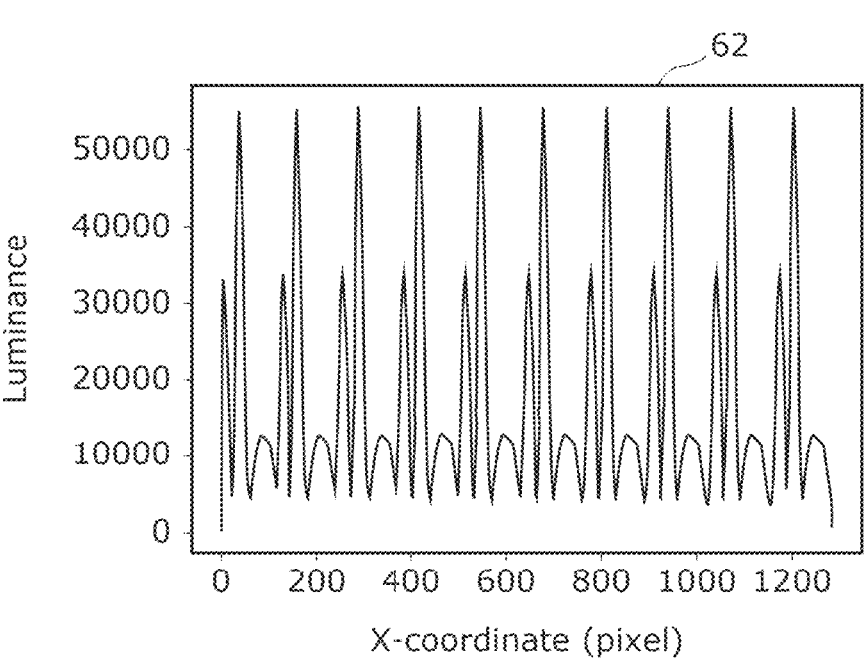
FIG. 5 is a diagram illustrating a one-dimensional luminance profile resulting from compressing, on the X-axis, the luminance of the inspection image shown in FIG. 4.
Figure 6:
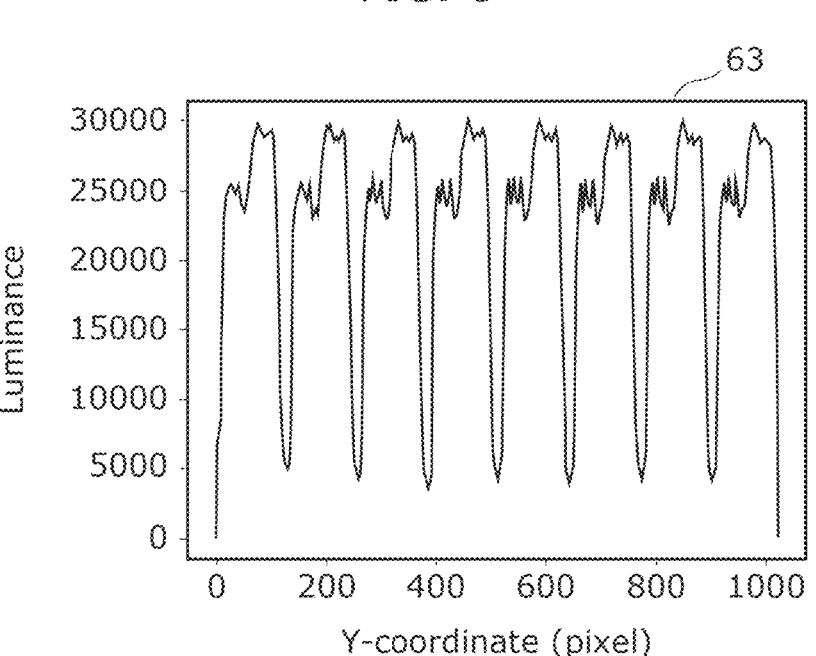
FIG. 6 is a diagram illustrating a one-dimensional luminance profile resulting from compressing, on the Y-axis, the luminance of the inspection image shown in FIG. 4.

FIG. 5 is a diagram illustrating one-dimensional luminance profile 62 resulting from compressing, on the X-axis, the luminance of inspection image 61 shown in FIG. 4. FIG. 6 is a diagram illustrating one-dimensional luminance profile 63 resulting from compressing, on the Y-axis, the luminance of inspection image 61 shown in FIG. 4. The ordinate in FIGS. 5 and 6 indicates the luminance, or more accurately, the total sum of luminances. The abscissa in FIG. 5 indicates the X-coordinate, i.e., the pixel position on the X-axis, whereas the abscissa in FIG. 6 indicates the Y-coordinate, i.e., the pixel position on the Y-axis. Note that compressing on the X-axis means calculating, at each pixel position on the X-axis, the total sum of the luminances of all the pixels along the Y axis at the pixel position. Similarly, compressing on the Y-axis means calculating, at each pixel position on the Y-axis, the total sum of the luminances of all the pixels along the X-axis at the pixel position.

In the embodiment, obtainer 101 obtains, as the inspection image of the pixel region of display panel 30 captured by imaging device 20, inspection image 61 shown in FIG. 4, for example. Obtainer 101 then performs image processing of compressing the luminance of obtained inspection image 61 into a one-dimensional luminance on the Y-axis, thereby obtaining one-dimensional luminance profile 63 shown in FIG. 6, for example.

Here, the reason for compressing the luminance of inspection image 61 on the Y-axis and not on the X-axis will be described with reference to one-dimensional luminance profile 62 shown in FIG. 5 and one-dimensional luminance profile 63 shown in FIG. 6.

One-dimensional luminance profile 62 shown in FIG. 5 results from compressing the luminance on the X-axis, i.e., in the arrangement direction of the subpixels in each pixel. Although the pixels are arranged periodically, the arrangement of the subpixels within one pixel (i.e., the arrangement of the subpixels along the X-axis) is asymmetric. Therefore, one-dimensional luminance profile 62 shown in FIG. 5 takes a complicated form. By contrast, one-dimensional luminance profile 63 shown in FIG. 6 results from compressing the luminance on the Y-axis, i.e., in the direction perpendicular to the arrangement direction of the subpixels in each pixel. Because the subpixels in the respective pixels along the Y-axis are arranged in a uniform pattern, one-dimensional luminance profile 63 shown in FIG. 6 takes a simple form. A simpler form of one-dimensional luminance profile is desirable for generator 102 (to be described below) to perform Fourier transform (fast Fourier transform) and determine what combination of forms (waveforms) makes up the form (waveform) of the one-dimensional luminance profile. Note that, if the cell pitch is uniform, i.e., if the R, G, and B subpixels have the same width, the luminance may be compressed either on the X-axis or on the Y-axis.

In this manner, obtainer 101 can obtain the one-dimensional luminance profile from the inspection image of the pixel region of display panel 30 captured by imaging device 20.

For comparison, the following will describe a case in which an out-of-focus, i.e., blurred, inspection image is obtained.

Figure 7A:
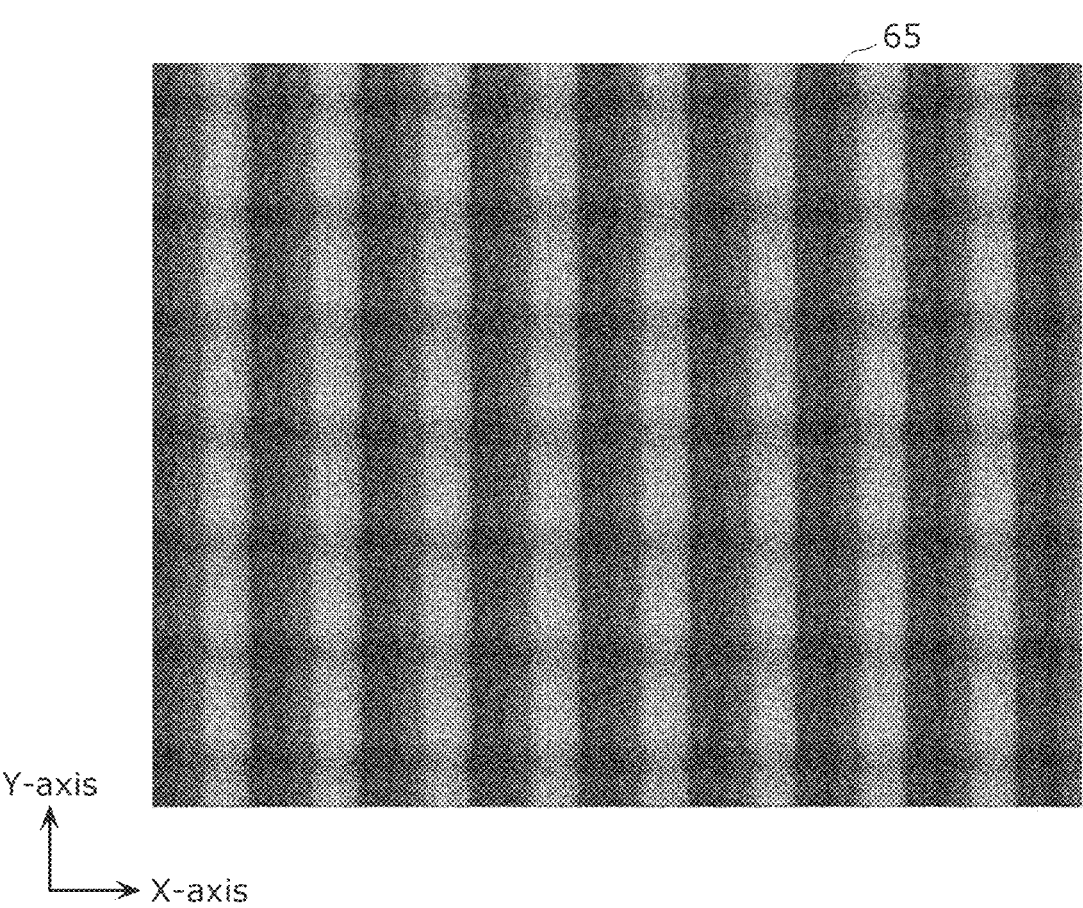
FIG. 7A is another example of an inspection image of a pixel region of a display panel according to an embodiment.
Figure 7B:
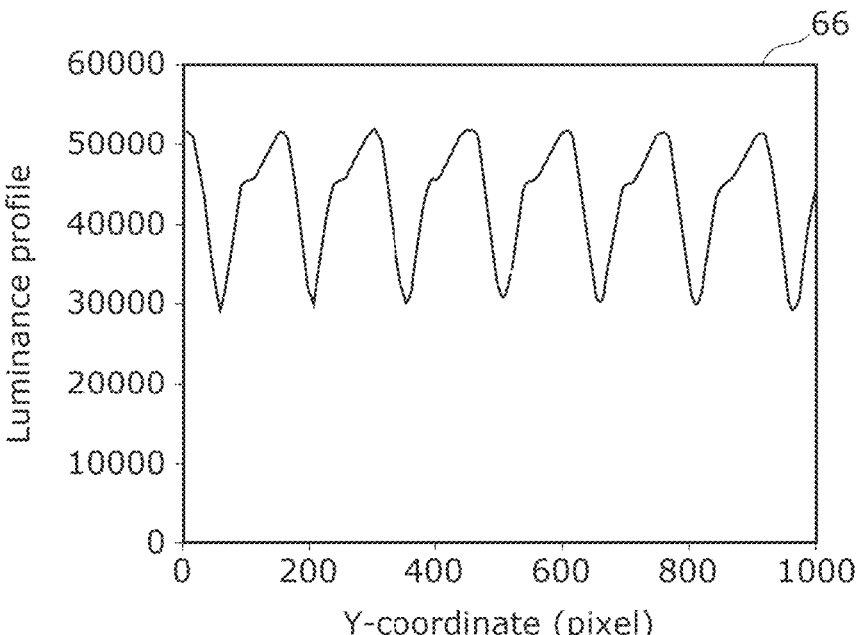
FIG. 7B is a diagram illustrating a one-dimensional luminance profile resulting from compressing, on the Y-axis, the luminance of the inspection image shown in FIG. 7A.

FIG. 7A is another example of the inspection image of the pixel region of display panel 30 according to the embodiment. FIG. 7B is a diagram illustrating one-dimensional luminance profile 66 resulting from compressing, on the Y-axis, the luminance of inspection image 65 shown in FIG. 7A.

Obtainer 101 obtains, as the inspection image of the pixel region of display panel 30 captured by imaging device 20, out-of-focus inspection image 65 shown in FIG. 7A, for example. Obtainer 101 then performs image processing of compressing the luminance of obtained inspection image 65 into a one-dimensional luminance on the Y-axis, thereby obtaining one-dimensional luminance profile 66 shown in FIG. 7B, for example. It can be seen that one-dimensional luminance profile 66 shown in FIG. 7B has a form different from the form of one-dimensional luminance profile 63 shown in FIG. 6.

[1-2-2. Generator 102]

Generator 102 generates a frequency spectrum intensity profile by performing Fourier transform on the one-dimensional luminance profile. Note that the Fourier transform and generation function of generator 102 may be implemented by a processor executing a control program stored in a memory in a computer that implements the functions of inspection device 10.

Note that, although fast Fourier transform is used as an example in the following description, any algorithm for Fourier transform may be used.

In addition, generator 102 may perform fast Fourier transform not only once but also twice on the one-dimensional luminance profile obtained by obtainer 101. More specifically, generator 102 may generate the frequency spectrum intensity profile by performing fast Fourier transform twice on the one-dimensional luminance profile obtained by obtainer 101. Here, generator 102 may generate the frequency spectrum intensity profile by performing fast Fourier transform further more times.

Figure 8:
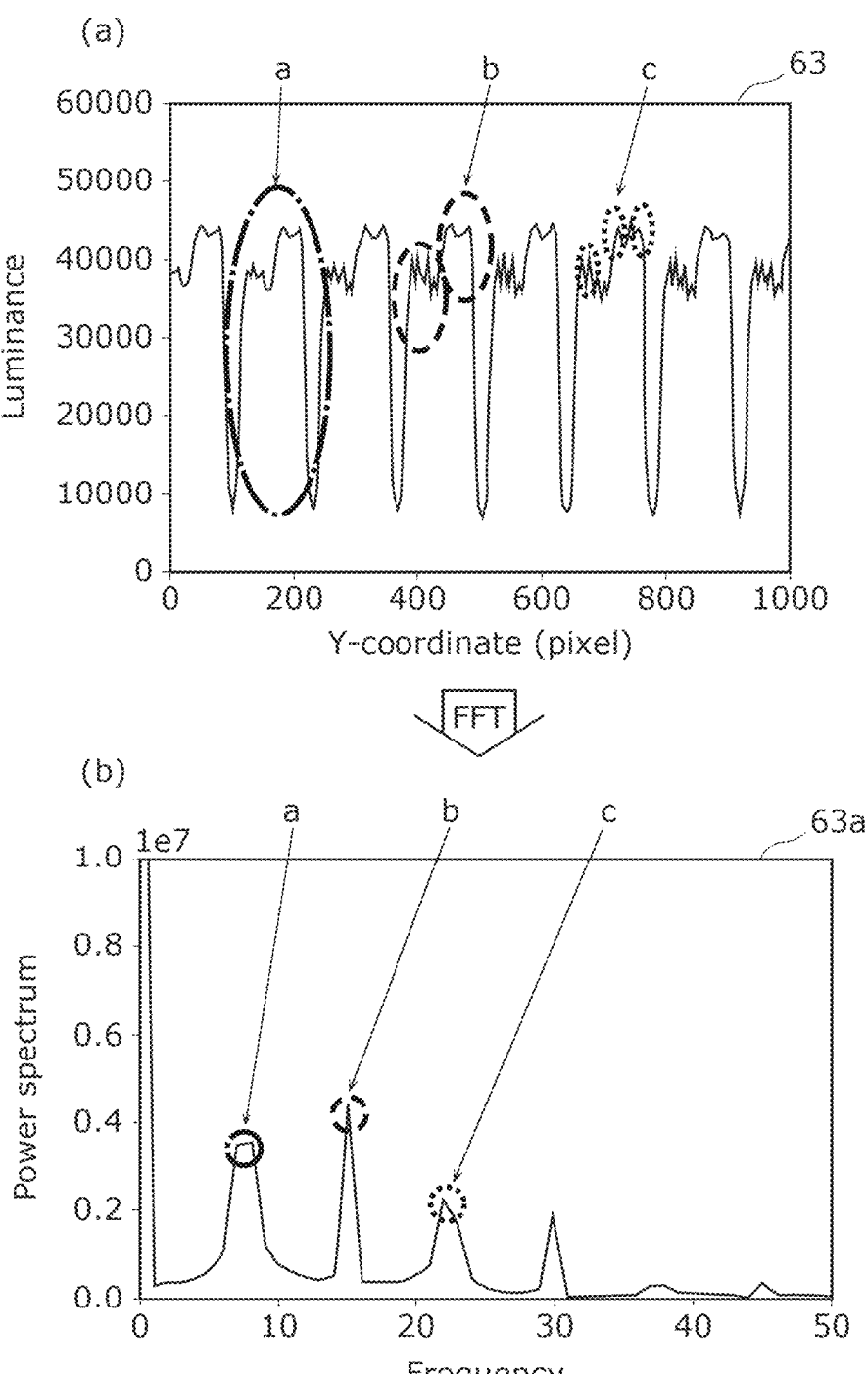
FIG. 8 is a diagram for describing an example of a one-dimensional luminance profile subjected to fast Fourier transform by a generator according to an embodiment.
Figure 9:
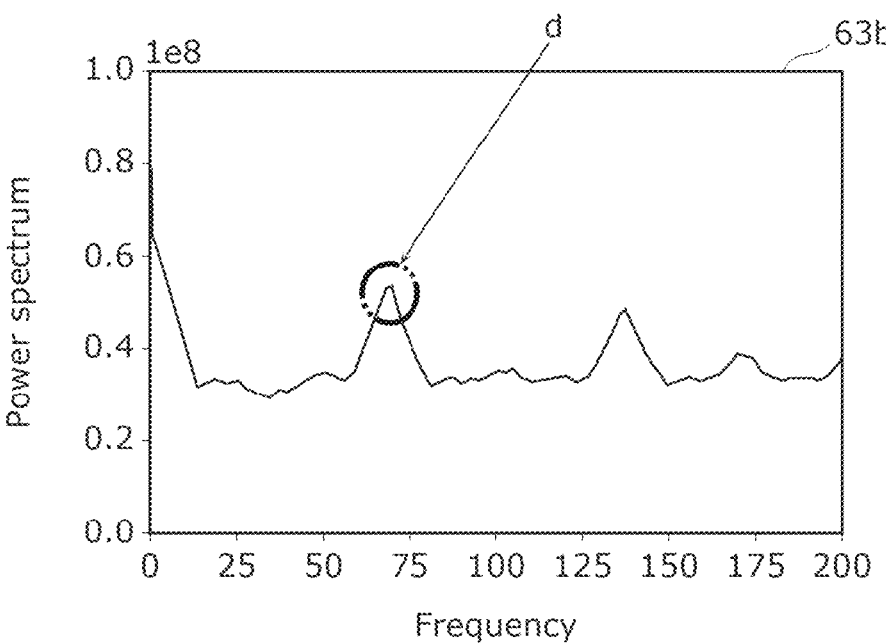
FIG. 9 is a diagram illustrating a frequency spectrum intensity profile resulting from performing fast Fourier transform twice on the one-dimensional luminance profile in FIG. 6.

FIG. 8 is a diagram for describing an example of the one-dimensional luminance profile subjected to fast Fourier transform by generator 102 according to the embodiment. In FIG. 8, (a) illustrates one-dimensional luminance profile 63 in FIG. 6, and (b) illustrates frequency spectrum intensity profile 63a resulting from performing fast Fourier transform once on one-dimensional luminance profile 63 in (a) in FIG. 8. FIG. 9 is a diagram illustrating frequency spectrum intensity profile 63*b* resulting from performing fast Fourier transform twice on one-dimensional luminance profile 63 in FIG. 6.

In the embodiment, generator 102 performs fast Fourier transform once or twice on, for example, one-dimensional luminance profile 63 shown in (a) in FIG. 8.

In an example, by regarding the form of one-dimensional luminance profile 63 shown in (a) in FIG. 8 as a waveform, generator 102 performs fast Fourier transform once on the waveform to generate frequency spectrum intensity profile 63*a* shown in (b) in FIG. 8. In another example, by regarding the form of one-dimensional luminance profile 63 shown in (a) in FIG. 8 as a waveform, generator 102 performs fast Fourier transform twice on the waveform to generate frequency spectrum intensity profile 63*b* shown in FIG. 9.

Here, description will be given for the case of performing fast Fourier transform once or twice on one-dimensional luminance profile 66 of inspection image 65 that is out of focus, i.e., blurred.

Figure 10:
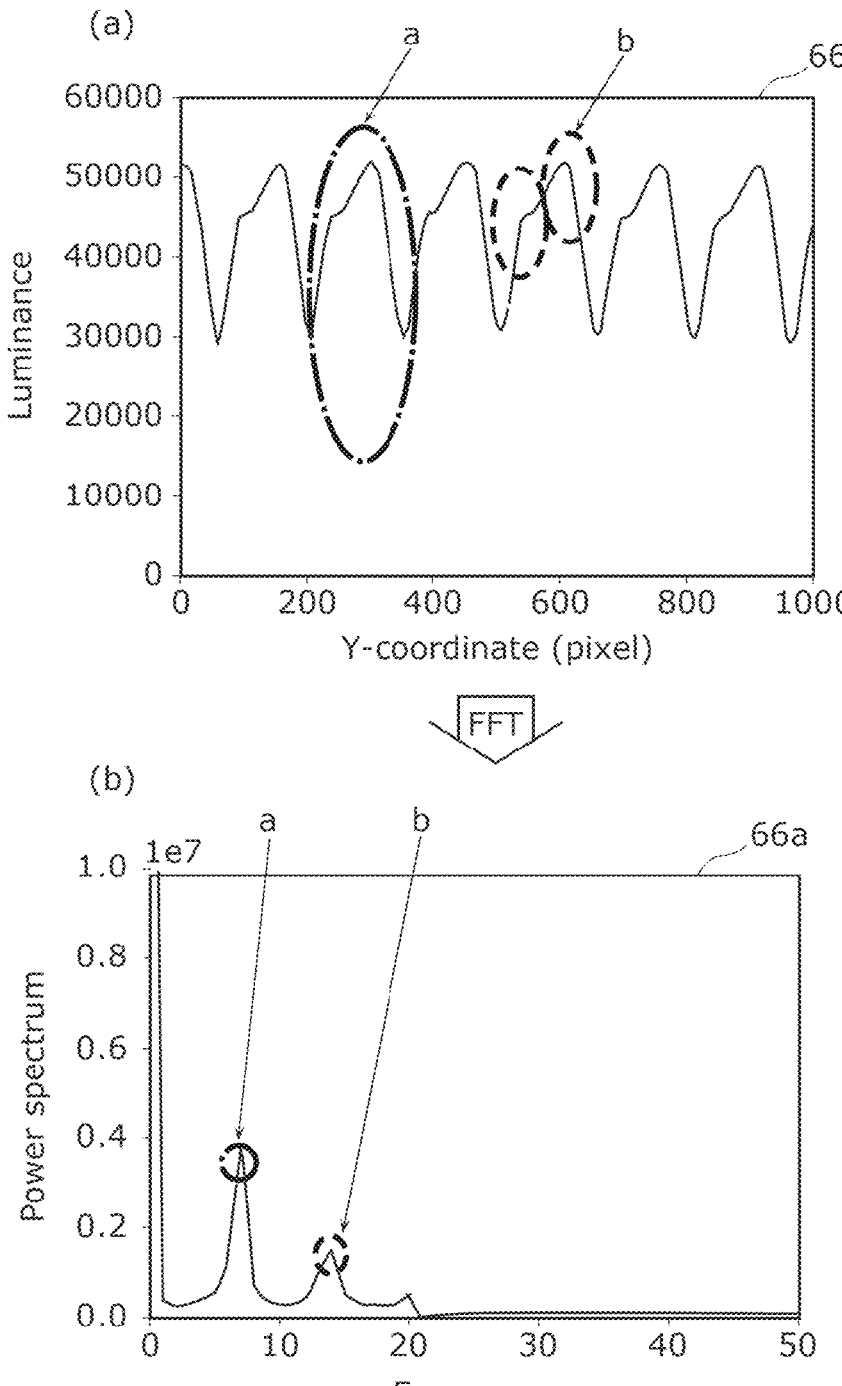
FIG. 10 is a diagram for describing another example of a one-dimensional luminance profile subjected to fast Fourier transform by a generator according to an embodiment.
Figure 11:
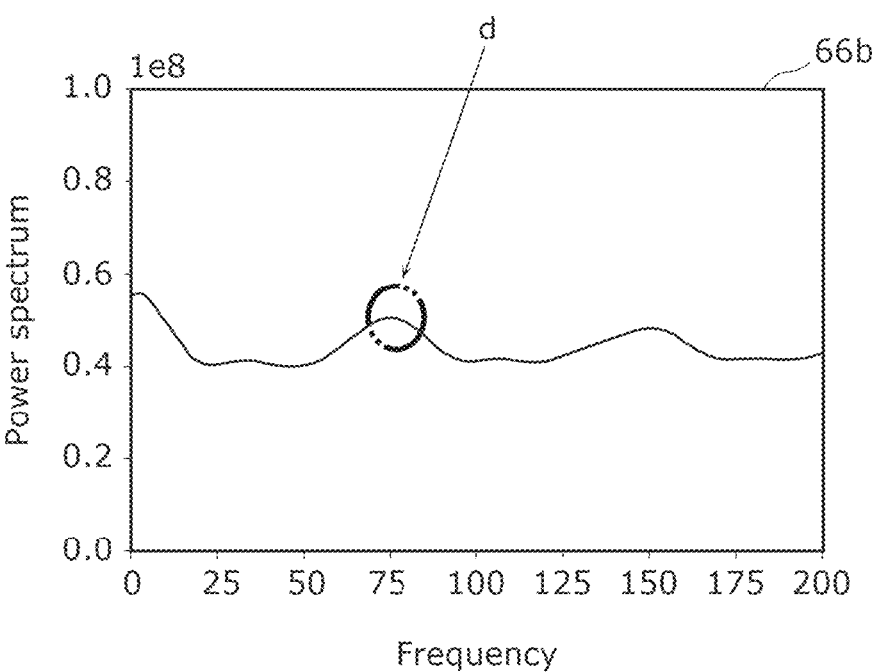
FIG. 11 is a diagram illustrating a frequency spectrum intensity profile resulting from performing fast Fourier transform twice on the one-dimensional luminance profile in FIG. 7B.

FIG. 10 is a diagram for describing another example of the one-dimensional luminance profile subjected to fast Fourier transform by generator 102 according to the embodiment. In FIG. 10, (a) illustrates one-dimensional luminance profile 66 in FIG. 7B, and (b) illustrates frequency spectrum intensity profile 66*a* resulting from performing fast Fourier transform once on one-dimensional luminance profile 66 in (a) in FIG. 10. FIG. 11 is a diagram illustrating frequency spectrum intensity profile 66*b* resulting from performing fast Fourier transform twice on one-dimensional luminance profile 66 in FIG. 7B.

In an example, by regarding the form of one-dimensional luminance profile 66 shown in (a) in FIG. 10 as a waveform, generator 102 performs fast Fourier transform once on the waveform to generate frequency spectrum intensity profile 66*a* shown in (b) in FIG. 10. In another example, by regarding the form of one-dimensional luminance profile 66 shown in (a) in FIG. 10 as a waveform, generator 102 performs fast Fourier transform twice on the waveform to generate frequency spectrum intensity profile 66*b* shown in FIG. 11.

Comparison with frequency spectrum intensity profile 63*a* shown in (b) in FIG. 8 reveals that frequency spectrum intensity profile 66*a* shown in (b) in FIG. 10 lacks power spectrum waves of high-frequency components.

In this manner, by regarding the form of the one-dimensional luminance profile of the inspection image as a waveform, generator 102 can perform fast Fourier transform on the waveform to generate a frequency spectrum intensity profile. The generated frequency spectrum intensity profile shows frequency components included in the waveform of the one-dimensional luminance profile of the inspection image, and their amplitudes.

[1-2-3. Calculator 103]

Calculator 103 calculates, based on the fact that a plurality of pixels are arranged in a periodic structure in the pixel region of display panel 30, an imaging magnification of imaging device 20 from one or more peak positions included in the frequency spectrum intensity profile. More specifically, calculator 103 estimates that, among the one or more peak positions, a peak position of a fundamental frequency is a peak position corresponding to a one-pixel unit structure of the pixel region shown in the inspection image, and calculates the imaging magnification of imaging device 20 from the peak position of the fundamental frequency. Note that the calculation function of calculator 103 may be implemented by, for example, a processor executing a control program stored in a memory in a computer that implements the functions of inspection device 10.

In the embodiment, calculator 103 calculates the imaging magnification of imaging device 20 from the frequency of and the power spectrum magnitude of a wave included in the frequency spectrum intensity profile generated by generator 102, and from the structural nature of the pixel region of display panel 30. The imaging magnification is the ratio between the size of an object image shown on the imaging plane and the actual size of the object. That is, the imaging magnification in the embodiment is the ratio between the pixel size in the pixel region shown in the inspection image captured by imaging device 20 and the pixel size in the actual pixel region of display panel 30.

More specifically, for example, of one or more waves included in frequency spectrum intensity profile 63*a* in (b) in FIG. 8, the wave indicated by dotted circle a has the lowest frequency component. Calculator 103 therefore estimates that the frequency of the wave indicated by dotted circle a is the fundamental frequency.

Here, as shown in (a) in FIG. 8, one-dimensional luminance profile 63 includes 1000 data items (1000 pixels). As shown in (b) in FIG. 8, the wave of the fundamental frequency in frequency spectrum intensity profile 63*a*, i.e., the wave indicated by dotted circle a, has the value 7 at the peak position. Calculator 103 can calculate 1000/7=143, allowing estimation that waves corresponding to 143 data cycles in one-dimensional luminance profile 63 shown in (a) in FIG. 8 are the waves indicated by dotted ellipse a. Inspection image 61 illustrated in FIG. 4 shows the pixel region having a periodic structure with eight pixels arranged along the Y-axis, and dotted ellipse a in one-dimensional luminance profile 63 shown in (a) in FIG. 8 indicates eight waves. The above suggests that the waves indicated by dotted ellipse a correspond to one pixel unit. Thus, it can be seen that the wave of the fundamental frequency indicated by dotted circle a in frequency spectrum intensity profile 63*a* corresponds to one pixel unit.

Similarly, for example, it is estimated that the wave indicated by dotted circle b in frequency spectrum intensity profile 63*a* in (b) in FIG. 8 corresponds to the waves indicated by dotted ellipses b in one-dimensional luminance profile 63 shown in (a) in FIG. 8. More specifically, as shown in (a) in FIG. 8, one-dimensional luminance profile 63 includes 1000 data items (data on 1000 pixels). As shown in (b) in FIG. 8, the wave indicated by dotted circle b in frequency spectrum intensity profile 63*a* has the value 14 at the peak position. Calculator 103 can calculate 1000/14=71, allowing estimation that waves corresponding to 71 data cycles in one-dimensional luminance profile 63 shown in (a) in FIG. 8 are the waves indicated by dotted ellipses b. Note that the waves indicated by dotted ellipses b in (a) in FIG. 8 correspond to the two-hump waves included in the waves indicated by dotted ellipses a. The frequency at the peak position of the wave indicated by dotted circle b in frequency spectrum intensity profile 63*a* in (b) in FIG. 8 is twice the fundamental frequency.

Similarly, for example, calculator 103 estimates that the wave indicated by dotted circle c in frequency spectrum intensity profile 63*a* in (b) in FIG. 8 corresponds to the waves indicated by dotted ellipses c in one-dimensional luminance profile 63 shown in (a) in FIG. 8. Note that the waves indicated by dotted ellipses c in (a) in FIG. 8 correspond to the three-thorn waves included in the waves indicated by dotted ellipses c. The frequency at the peak position of the wave indicated by dotted circle c in frequency spectrum intensity profile 63a in (b) in FIG. 8 is three times the fundamental frequency.

In this manner, calculator 103 can calculate the fundamental frequency from the peak position(s) of one or more waves included in the frequency spectrum intensity profile. Calculator 103 can also calculate the data cycles on a pixel basis from the structural nature of the pixels having a periodic structure in the pixel region of display panel 30. Calculator 103 can then calculate the pixel size in the pixel region shown in the inspection image captured by imaging device 20. This enables calculator 103 to calculate the imaging magnification using the pixel size in the actual pixel region of display panel 30.

Note that calculator 103 in the embodiment may calculate, as the imaging magnification, the value at the peak position of the fundamental frequency obtained by performing fast Fourier transform once or twice on the one-dimensional luminance profile.

More specifically, calculator 103 may calculate, as the imaging magnification, the value 7 of the fundamental frequency of frequency spectrum intensity profile 63a in (b) in FIG. 8 resulting from performing fast Fourier transform once on the one-dimensional luminance profile. Calculator 103 may also calculate, as the imaging magnification, the value of the fundamental frequency of frequency spectrum intensity profile 63b in FIG. 9 resulting from performing fast Fourier transform twice on the one-dimensional luminance profile. In frequency spectrum intensity profile 63b in FIG. 9, the wave indicated by dotted circle d has the lowest frequency component; therefore, the frequency at the peak position of the wave indicated by dotted circle d is the fundamental frequency.

The above description has been directed to frequency spectrum intensity profile 63a of in-focus inspection image 61, i.e., inspection image 61 in proper focus. The same applies to frequency spectrum intensity profile 66a of out-of-focus inspection image 65, as will be described below.

For example, of one or more waves included in frequency spectrum intensity profile 66a in (b) in FIG. 10, the wave indicated by dotted circle a has the lowest frequency component. Calculator 103 can therefore estimate that the frequency of the wave indicated by dotted circle a is the fundamental frequency.

More specifically, as shown in (a) in FIG. 10, one-dimensional luminance profile 66 includes 1000 data items (data on 1000 pixels). As shown in (b) in FIG. 10, the wave of the fundamental frequency indicated by dotted circle a in frequency spectrum intensity profile 66a has the value 7 at the peak position. Calculator 103 can calculate 1000/7=143, allowing estimation that waves corresponding to 143 data cycles in one-dimensional luminance profile 66 shown in (a) in FIG. 10 are the waves indicated by dotted ellipse a. Note that it is suggested that the waves indicated by dotted ellipse a in (a) in FIG. 10 correspond to one pixel unit. Thus, it can be seen that the wave of the fundamental frequency indicated by dotted circle a in frequency spectrum intensity profile 66a corresponds to one pixel unit.

Similarly, for example, it is estimated that the wave indicated by dotted circle b in frequency spectrum intensity profile 66a in (b) in FIG. 10 corresponds to the waves indicated by dotted ellipses b in one-dimensional luminance profile 66 shown in (a) in FIG. 10. More specifically, as shown in (a) in FIG. 10, one-dimensional luminance profile 66 includes 1000 data items (data on 1000 pixels). As shown in (b) in FIG. 10, the wave indicated by dotted circle b in frequency spectrum intensity profile 66a has the value 14 at the peak position. Calculator 103 can calculate 1000/14=71, allowing estimation that waves corresponding to 71 data cycles in one-dimensional luminance profile 66 shown in (a) in FIG. 10 are the waves indicated by dotted ellipses b. Note that the waves indicated by dotted ellipses b in (a) in FIG. 10 correspond to the two-hump waves included in the waves indicated by dotted ellipses a. The frequency at the peak position of the wave indicated by dotted circle b in frequency spectrum intensity profile 66a in (b) in FIG. 10 is twice the fundamental frequency.

Thus, the fundamental frequency can be addressed in frequency spectrum intensity profile 66a of out-of-focus inspection image 65 in the same manner as in frequency spectrum intensity profile 63a of in-focus inspection image 61. That is, calculator 103 can calculate the imaging magnification from frequency spectrum intensity profile 66a of out-of-focus inspection image 65.

Again, calculator 103 may calculate, as the imaging magnification, the value 7 of the fundamental frequency of frequency spectrum intensity profile 66a in (b) in FIG. 10 resulting from performing fast Fourier transform once on the one-dimensional luminance profile. Calculator 103 may also calculate, as the imaging magnification, the value of the fundamental frequency of frequency spectrum intensity profile 66b in FIG. 11 resulting from performing fast Fourier transform twice on the one-dimensional luminance profile. In frequency spectrum intensity profile 66b in FIG. 11, the wave indicated by dotted circle d has the lowest frequency component; therefore, the frequency at the peak position of the wave indicated by dotted circle d is the fundamental frequency.

[1-2-4. Estimator 104]

Estimator 104 estimates the current focus position, which is a focus position of imaging device 20 in the inspection image, from the imaging magnification calculated by calculator 103 and magnification information indicating a relationship between a focus position and an imaging magnification of imaging device 20. Note that the estimation function of estimator 104 may be implemented by, for example, a processor executing a control program stored in a memory in a computer that implements the functions of inspection device 10.

Imaging device 20 according to the embodiment may have an optical system of all-group focusing type, in which focus positions are in a one-to-one correspondence with imaging magnifications. This magnification information indicating the relationship in imaging device 20 between the focus position and the imaging magnification can be obtained in advance. Imaging device 20 according to the embodiment may also have an optical system of inner focus type, in which the focus position has a strong correlation with the imaging magnification. This magnification information indicating the relationship in imaging device 20 between the focus position and the imaging magnification can also be obtained in advance.

Estimator 104 can therefore refer to the magnification information to estimate, from the imaging magnification calculated by calculator 103, the current focus position of imaging device 20 in the inspection image.

Note that, as described above, the imaging magnification in the embodiment may be defined as the value of the fundamental frequency obtained by performing fast Fourier transform on the one-dimensional luminance profile of the image of the pixel region of display panel 30 captured by imaging device 20. In that case, the magnification information of imaging device 20 may be information indicating the relationship between focus positions of imaging device 20 and the values of fundamental frequencies (imaging magnifications) obtained by performing fast Fourier transform on one-dimensional luminance profiles corresponding to the respective focus positions.

Figure 12:
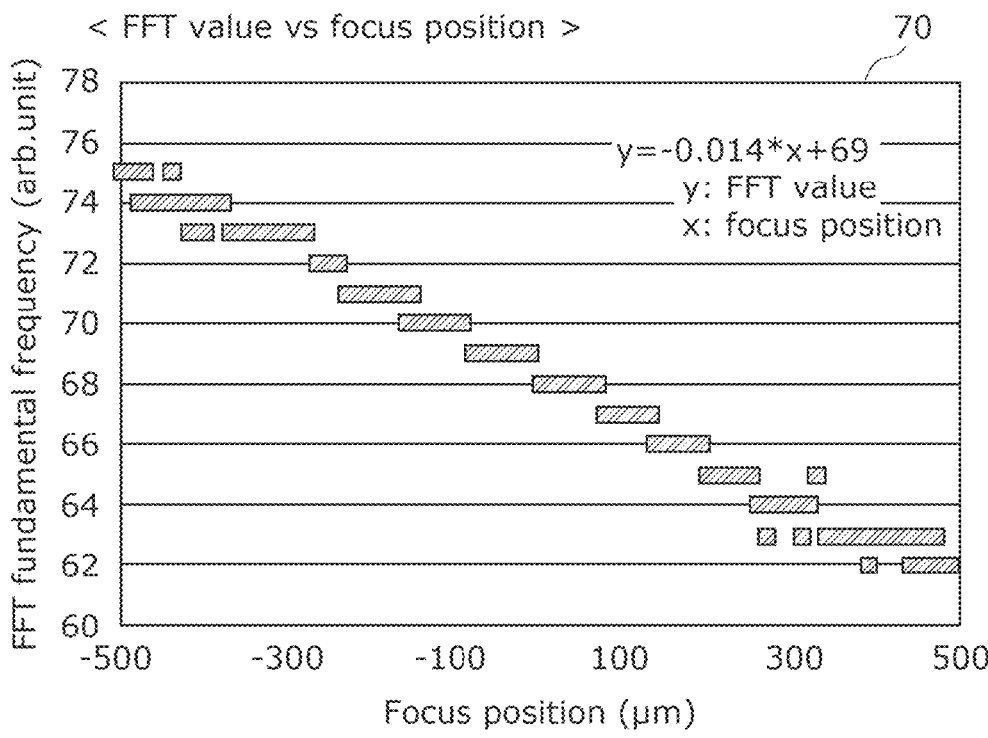
FIG. 12 is a diagram illustrating an example of magnification information according to an embodiment, in which imaging magnification is defined as the value of a fundamental frequency.

FIG. 12 is a diagram illustrating an example of the magnification information according to the embodiment, in which the imaging magnification is defined as the value of the fundamental frequency. The FFT values illustrated in FIG. 12 are the values of fundamental frequencies obtained by performing Fourier transform twice on one-dimensional luminance profiles.

FIG. 12 illustrates magnification information 70, indicating the relationship between focus positions of imaging device 20 and FFT values obtained from images of the pixel region of display panel 30 captured at the respective focus positions. Magnification information 70 shown in FIG. 12 was created in the following manner. First, the pixel region of display panel 30 was captured with the focus position of imaging device 20 varied in steps of 10 μm over the range of −500 μm to 500 μm, yielding 100 varying-focus images. The obtained 100 varying-focus images were compressed on the Y-axis into one-dimensional luminance profiles, which were then subjected to fast Fourier transform twice. FFT values were calculated, which are the values of the fundamental frequencies for the 100 varying-focus images. The relationship between the 100 different focus positions and the FFT values was linearly approximated to form an approximate straight line. Thus, magnification information 70 shown in FIG. 12 was created.

Based on magnification information 70 shown in FIG. 12, estimator 104 can estimate the current focus position of imaging device 20 from the FFT value, which is the imaging magnification calculated by calculator 103. Furthermore, magnification information 70 shown in FIG. 12 can be used to calculate the distance from the current focus position to the in-focus position at 0 μm.

Note that the above description of the example shown in FIG. 12 assumes that the FFT values are the values of fundamental frequencies obtained by performing fast Fourier transform twice on one-dimensional luminance profiles. However, this is not limiting. The FFT values may be the values of fundamental frequencies obtained by performing fast Fourier transform once on one-dimensional luminance profiles. This configuration can also create magnification information similar to magnification information 70 shown in FIG. 12. Estimator 104 can then estimate, based on the similarly created magnification information, the current focus position of imaging device 20 from the FFT value, which is the imaging magnification calculated by calculator 103.

[1-2-5. Focus Adjuster 105]

Focus adjuster 105 calculates, from the current focus position estimated by estimator 104 and the magnification information, an amount of movement of imaging device 20 necessary for achieving focus, and adjusts the position of imaging device 20 using the amount of movement calculated. Note that the above adjustment function of focus adjuster 105 may be implemented by a processor executing a control program stored in a memory in a computer that implements the functions of inspection device 10.

As described above, the imaging magnification in the embodiment may be defined as the value of the fundamental frequency obtained by performing fast Fourier transform on the one-dimensional luminance profile of the image of the pixel region of display panel 30 captured by imaging device 20. In that case, the magnification information to be used may be information indicating the relationship between focus positions of imaging device 20 and the values of fundamental frequencies (FFT values) obtained by performing fast Fourier transform on one-dimensional luminance profiles corresponding to the respective focus positions. An example of this magnification information is above-described magnification information 70 in FIG. 12. Using the magnification information as illustrated in FIG. 12 or using the approximate straight line included in the magnification information as illustrated in FIG. 12, focus adjuster 105 can calculate the distance from the current focus position to the in-focus position at 0 μm. Thus, from the magnification information as illustrated in FIG. 12 and the current focus position estimated by estimator 104, focus adjuster 105 can calculate the amount of movement of imaging device 20 necessary for achieving focus. Focus adjuster 105 can then adjust the position of imaging device 20 using the calculated amount of movement.

In this manner, inspection device 10 can adjust the focus of imaging device 20 to obtain an in-focus, high-quality inspection image.

[1-3. Operations of Inspection Device 10]

An example of operations of inspection device 10 configured as above will be described below.

Figure 13:
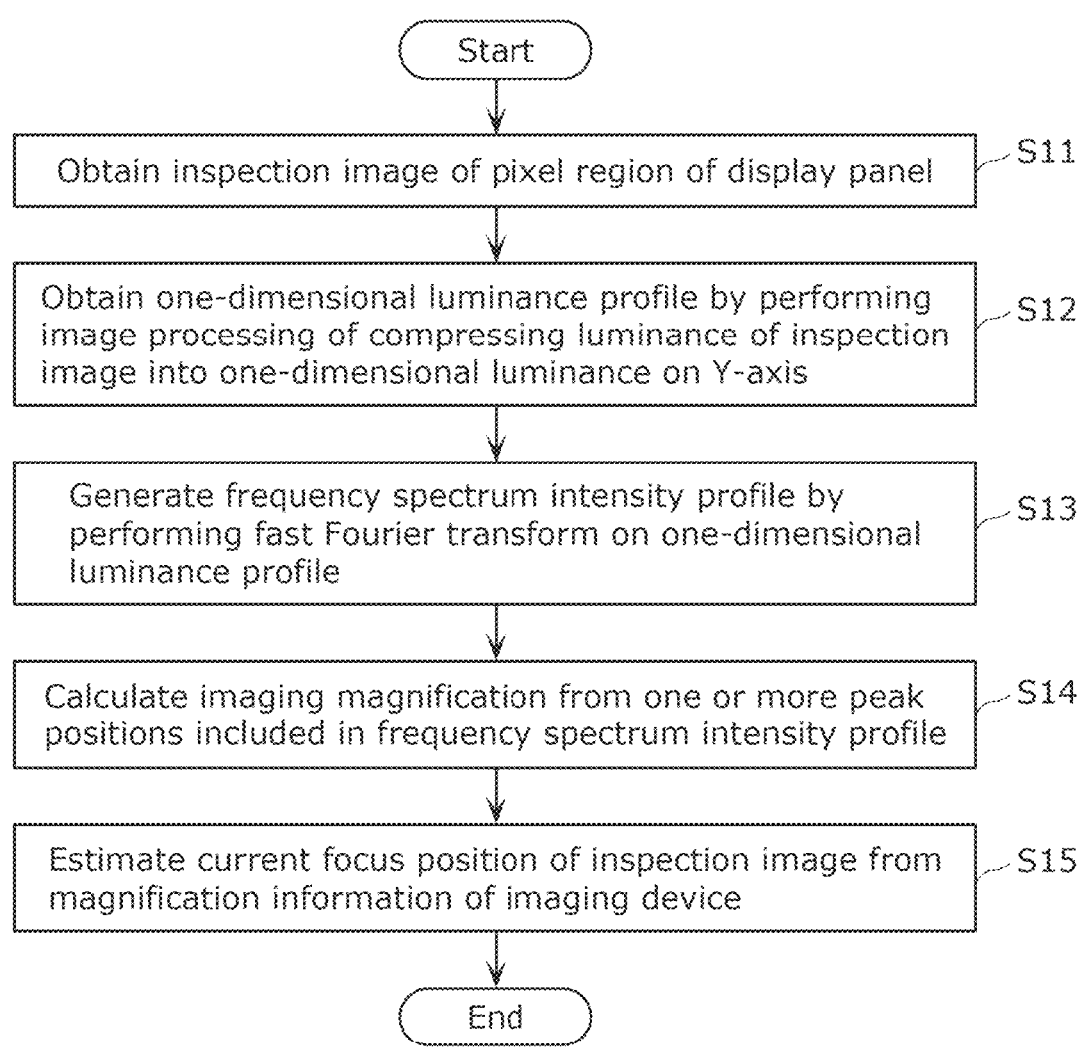
FIG. 13 is a flowchart illustrating operations of an inspection device according to an embodiment.

FIG. 13 is a flowchart illustrating operations of inspection device 10 according to the embodiment.

Inspection device 10 obtains an inspection image of a pixel region of display panel 30 (S11). More specifically, obtainer 101 obtains an inspection image of a pixel region of display panel 30 captured by imaging device 20. For example, obtainer 101 obtains an inspection image, such as inspection image 61 shown in FIG. 4 or inspection image 65 shown in FIG. 7A, of a pixel region of display panel 30.

Inspection device 10 obtains a one-dimensional luminance profile by performing image processing of compressing the luminance of the inspection image obtained at step S11 into a one-dimensional luminance on the Y-axis (S12). More specifically, obtainer 101 obtains a one-dimensional luminance profile by performing image processing of compressing the luminance of the obtained inspection image into a one-dimensional luminance on an axis (the Y-axis) in the direction perpendicular to the arrangement direction of a plurality of subpixels included in one pixel of a plurality of pixels each including a plurality of subpixels. For example, obtainer 101 compresses the luminance of the inspection image on the Y-axis to obtain a one-dimensional luminance profile, such as one-dimensional luminance profile 63 shown in FIG. 6 or one-dimensional luminance profile 66 shown in FIG. 7B.

Inspection device 10 generates a frequency spectrum intensity profile by performing fast Fourier transform on the one-dimensional luminance profile obtained at step S12 (S13). More specifically, generator 102 generates a frequency spectrum intensity profile by performing fast Fourier transform once or twice on the one-dimensional luminance profile obtained at step S12.

For example, generator 102 performs fast Fourier transform once on the above one-dimensional luminance profile to generate a frequency spectrum intensity profile, such as frequency spectrum intensity profile 63a shown in (b) in FIG. 8 or frequency spectrum intensity profile 66a shown in (b) in FIG. 10. Note that generator 102 may perform fast Fourier transform twice on the above one-dimensional luminance profile to generate a frequency spectrum intensity profile, such as frequency spectrum intensity profile 63b shown in FIG. 9 or frequency spectrum intensity profile 66b shown in FIG. 11.

Inspection device 10 calculates the imaging magnification of imaging device 20 from the peak position(s) of one or more waves included in the frequency spectrum intensity profile generated at step S13 (S14). More specifically, calculator 103 calculates the imaging magnification of imaging device 20 from the frequency of and the power spectrum magnitude of a wave included in the frequency spectrum intensity profile generated by generator 102, and from the structural nature of the pixel region of display panel 30. Calculator 103 estimates that the peak position of the fundamental frequency among the one or more peak positions is the peak position corresponding to a one-pixel unit structure of the pixel region shown in the inspection image, and calculates the imaging magnification of imaging device 20 from the peak position of the fundamental frequency. For example, calculator 103 calculates the fundamental frequency from the peak position(s) of one or more waves included in frequency spectrum intensity profile 63a in (b) in FIG. 8 or frequency spectrum intensity profile 66a in (b) in FIG. 10, and calculates the imaging magnification using the calculated fundamental frequency.

Inspection device 10 estimates, from magnification information of imaging device 20, the current focus position of imaging device 20 that has captured the inspection image (S15). More specifically, estimator 104 estimates the current focus position, which is the focus position of imaging device 20 in the inspection image, from the calculated imaging magnification and from magnification information indicating the relationship between the focus position and the imaging magnification of imaging device 20. Note that the imaging magnification may be defined as the value of the fundamental frequency obtained by performing fast Fourier transform once or twice on the one-dimensional luminance profile of the image of the captured pixel region of display panel 30. In that case, the magnification information of imaging device 20 may be information indicating the relationship between focus positions and the values of fundamental frequencies (imaging magnifications) obtained by performing fast Fourier transform once or twice. This magnification information may be used to calculate the imaging magnification, from which the current focus position may be estimated.

[1-4. Advantageous Effects Etc.]

Inspection device 10 and the like according to the embodiment performs image processing of compressing the luminance of an inspection image of a pixel region of display panel 30 captured by imaging device 20, into a one-dimensional luminance on an axis in a direction perpendicular to an arrangement direction of a plurality of subpixels included in one pixel of a plurality pixels each including a plurality of subpixels. Inspection device 10 and the like according to the embodiment generates a frequency spectrum intensity profile by performing Fourier transform on the one-dimensional luminance profile obtained through such image processing as described above. The Fourier transform is performed at least once, and may be performed twice. Inspection device 10 and the like according to the present embodiment calculates, based on the fact that the plurality of pixels are arranged in a periodic structure in the pixel region, an imaging magnification of imaging device 20 from one or more peak positions included in the frequency spectrum intensity profile. Inspection device 10 and the like according to the present embodiment then estimates a current focus position of imaging device 20 in the inspection image from the imaging magnification calculated and magnification information indicating a relationship between a focus position and an imaging magnification of imaging device 20.

As above, inspection device 10 and the like according to the embodiment compress the luminance of the inspection image captured by imaging device 20 into the one-dimensional luminance, which is then Fourier-transformed. The frequency spectrum intensity profile resulting from Fourier transform is used to estimate the current focus position of imaging device 20 in the inspection image. The optical system, including lenses, of imaging device 20 shows a strong correlation between the focus position and the imaging magnification. In addition, the pixel region of display panel 30 has a periodic structure. Based on these characteristics, the current focus position is estimated from the frequency spectrum intensity profile.

That is, inspection device 10 and the like according to the embodiment can estimate the current focus position of imaging device 20 in the inspection image with just arithmetic processing and without the need for dedicated hardware. With the performance level of a computer having components such as modern processors, inspection device 10 and the like according to the embodiment can quickly compress the luminance of the inspection image captured by imaging device 20 into the one-dimensional luminance and perform Fourier transform.

Thus, inspection device 10 and the like according to the embodiment enable processing for fast autofocus without the need for dedicated hardware.

Here, inspection device 10 and the like according to the embodiment estimates that, among the one or more peak positions included in the frequency spectrum intensity profile, a peak position of a fundamental frequency is a peak position corresponding to a one-pixel unit structure of the pixel region shown in the inspection image. From the estimated peak position of the fundamental frequency, the imaging magnification of imaging device 20 is calculated.

In this manner, the current focus position can be estimated from the frequency spectrum intensity profile. This allows the imaging magnification to be calculated even from an out-of-focus, blurred inspection image captured by imaging device 20.

Furthermore, inspection device 10 and the like according to the embodiment may generate the frequency spectrum intensity profile by performing the Fourier transform twice on the one-dimensional luminance profile obtained by compressing the luminance of the inspection image captured by imaging device 20 into the one-dimensional luminance. This facilitates estimating the fundamental frequency from the frequency spectrum intensity profile.

The magnification information need not be obtained from an optical nature of imaging device 20. More specifically, when an image of the pixel region of display panel 30 is captured at each of a plurality of focus positions of imaging device 20, and a value of a fundamental frequency is obtained by performing the Fourier transform on a one-dimensional luminance profile of the image captured at the focus position, the magnification information may be information indicating a relationship between the value of the fundamental frequency and the focus position. Here, the imaging magnification is defined as the value of the fundamental frequency.

Using the above magnification information, the current focus position can be directly estimated from the fundamental frequency of the frequency spectrum intensity profile generated by performing Fourier transform once or twice. This allows fast estimation of the current focus position.

Furthermore, inspection device 10 and the like according to the embodiment may further calculate, from the current focus position estimated and the magnification information, an amount of movement of imaging device 20 necessary for achieving focus, and adjust the position of imaging device 20 using the amount of movement calculated.

As above, using the magnification information and the inspection image, the current focus position and the amount of movement of imaging device 20 necessary for achieving focus can be obtained with just arithmetic processing. This enables processing for fast autofocus without the need for dedicated hardware.

That is, inspection device 10 and the like according to the embodiment enable highly accurate and fast autofocus without the need for dedicated hardware.

In other words, inspection device 10 and the like according to the embodiment can perform fast processing for autofocus (AF) without the need for dedicated AF hardware, using the inspection image itself captured by imaging device 20. This enables fast AF processing with the advantages of high focus accuracy and no calibration required, without the need for dedicated AF hardware.

Hereinbefore, an inspection device, an inspection method, and the like according to the present disclosure have been described based on an embodiment and variation, but the present disclosure is not limited to the above embodiment and variation. Various modifications of the embodiment and variation as well as other forms resulting from combinations of some of the constituent elements in the embodiment and variation that may be conceived by those skilled in the art are also included within the scope of the present disclosure so long as these do not depart from the essence of the present disclosure.

The following forms may also be included within the scope of one or more aspects of the present disclosure.

(1) One or more of the constituent elements included in the inspection device described above may be a computer system including a microprocessor, ROM, RAM, GPU, a hard disk unit, a display unit, a keyboard, a mouse, etc. The RAM or hard disk unit stores a computer program. The microprocessor fulfills the functions by operating in accordance with the computer program. Here, the computer program is configured by combining a plurality of instruction codes indicating instructions to the computer in order to fulfill a given function.

(2) One or more of the constituent elements included in the inspection device described above may be configured as a single system large scale integration (LSI) circuit. A system LSI is a super multifunctional LSI manufactured by integrating a plurality of elements on a single chip, and is specifically a computer system including, for example, a microprocessor, ROM, RAM, and GPU. A computer program is stored in the RAM. The system LSI circuit fulfills the functions as a result of the microprocessor or GPU operating according to the computer program.

(3) One or more of the constituent elements included in the inspection device described above may be configured as an IC card or standalone module attachable to and detachable from each device. The IC card or module is a computer system including, for example, a microprocessor, ROM, RAM, and GPU. The IC card or module may include the above-described super multifunctional LSI. The IC card or module fulfills the functions as a result of the microprocessor or GPU operating according to a computer program. The IC card or module may be tamperproof.

(4) In addition, one or more of the constituent elements included in the inspection device described above may be a computer-readable recording medium, such as a flexible disk, a hard disk, a CD-ROM, an MO, a DVD, a DVD-ROM, DVD-RAM, a Blu-ray Disc (BD; registered trademark), semiconductor memory, etc., having recording thereon the computer program or the digital signal. One or more of the constituent elements included in the inspection device described above may be the digital signal recorded on these recording media.

In addition, one or more of the constituent elements included in the inspection device described above may transmit the computer program or the digital signal via, for example, a telecommunication line, a wireless or wired communication line, a network such as the Internet, or data broadcasting.

(5) The present disclosure may be the methods described above. Also, the present disclosure may be a computer program realizing these methods with a computer, or a digital signal of the computer program.

(6) Moreover, the present disclosure may be a computer system including a microprocessor, GPU, and memory. The memory may have the computer program stored therein, and the microprocessor or GPU may operate according to the computer program.

(7) In addition, the present disclosure may be implemented by another independent computer system by recording the program or the digital signal on the recording medium and transporting it, or by transporting the program or the digital signal via the network, etc.

(8) Furthermore, one or more of the constituent elements included in the inspection device described above may be implemented in the cloud or by a server device.

(9) The above embodiment and variations may be arbitrarily combined.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable for inspection methods, inspection devices, and programs that enable low-cost, high-focus-accuracy, and fast autofocus for capturing an inspection image of a pixel region of a display panel in the process of inspecting the display panel.

The invention claimed is:

1. An inspection method, to be performed by a computer, for inspecting a display panel, the inspection method comprising:

obtaining a one-dimensional luminance profile by performing image processing of compressing a luminance of an inspection image of a pixel region of the display panel captured by an imaging device, into a one-dimensional luminance on an axis in a direction perpendicular to an arrangement direction of a plurality of subpixels included in one pixel of a plurality pixels each including a plurality of subpixels;

generating a frequency spectrum intensity profile by performing Fourier transform on the one-dimensional luminance profile;

calculating, based on a fact that the plurality of pixels are arranged in a periodic structure in the pixel region, an imaging magnification of the imaging device from one or more peak positions included in the frequency spectrum intensity profile; and estimating a current focus position from the imaging magnification calculated and magnification information indicating a relationship between a focus position and an imaging magnification of the imaging device, the current focus position being a focus position of the imaging device in the inspection image.

2. The inspection method according to claim 1, wherein in the calculating, among the one or more peak positions, a peak position of a fundamental frequency is estimated to be a peak position corresponding to a one-pixel unit structure of the pixel region shown in the inspection image, and the imaging magnification of the imaging device is calculated from the peak position of the fundamental frequency.

3. The inspection method according to claim 2, wherein in the generating, the frequency spectrum intensity profile is generated by performing the Fourier transform twice on the one-dimensional luminance profile.

4. The inspection method according to claim 2, wherein when an image of the pixel region of the display panel is captured by the imaging device at each of a plurality of focus positions of the imaging device, and a value of a fundamental frequency obtained by performing the Fourier transform on a one-dimensional luminance profile of the image captured at the focus position is used as the imaging magnification, the magnification information is information indicating a relationship between the value of the fundamental frequency and the focus position.

5. The inspection method according to claim 1, further comprising:

calculating, from the current focus position estimated and the magnification information, an amount of movement of the imaging device necessary for achieving focus, and adjusting a position of the imaging device using the amount of movement.

6. An inspection device that inspects a display panel, the inspection device comprising:

an obtainer that obtains a one-dimensional luminance profile by performing image processing of compressing a luminance of an inspection image of a pixel region of the display panel captured by an imaging device, into a one-dimensional luminance on an axis in a direction perpendicular to an arrangement direction of a plurality of subpixels included in one pixel of a plurality pixels each including a plurality of subpixels;

a generator that generates a frequency spectrum intensity profile by performing Fourier transform on the one-dimensional luminance profile;

a calculator that calculates, based on a fact that the plurality of pixels are arranged in a periodic structure in the pixel region, an imaging magnification of the imaging device from one or more peak positions included in the frequency spectrum intensity profile; and an estimator that estimates a current focus position from the imaging magnification calculated and magnification information indicating a relationship between a focus position and an imaging magnification of the imaging device, the current focus position being a focus position of the imaging device in the inspection image.

7. A non-transitory computer-readable recording medium having recorded thereon a program for causing a computer to execute an inspection method for inspecting a display panel, the inspection method including:

obtaining a one-dimensional luminance profile by performing image processing of compressing a luminance of an inspection image of a pixel region of the display panel captured by an imaging device, into a one-dimensional luminance on an axis in a direction perpendicular to an arrangement direction of a plurality of subpixels included in one pixel of a plurality pixels each including a plurality of subpixels;

generating a frequency spectrum intensity profile by performing Fourier transform on the one-dimensional luminance profile;

calculating, based on a fact that the plurality of pixels are arranged in a periodic structure in the pixel region, an imaging magnification of the imaging device from one or more peak positions included in the frequency spectrum intensity profile; and estimating a current focus position from the imaging magnification calculated and magnification information indicating a relationship between a focus position and an imaging magnification of the imaging device, the current focus position being a focus position of the imaging device in the inspection image.

* * * * *